(12) United States Patent
Pikarski

(10) Patent No.: US 11,306,755 B2
(45) Date of Patent: Apr. 19, 2022

(54) DRAIN ROD SYSTEM AND CONNECTORS THEREFOR

(71) Applicant: Power Box AG, Zug (CH)

(72) Inventor: Daniel Pikarski, Somerset (GB)

(73) Assignee: Power Box AG, Zug (CH)

( * ) Notice: Subject to any disclaimer, the term of this patent is extended or adjusted under 35 U.S.C. 154(b) by 923 days.

(21) Appl. No.: 15/746,735

(22) PCT Filed: Jul. 20, 2016

(86) PCT No.: PCT/IB2016/001031
§ 371 (c)(1),
(2) Date: Jan. 22, 2018

(87) PCT Pub. No.: WO2017/013483
PCT Pub. Date: Jan. 26, 2017

(65) Prior Publication Data
US 2018/0216646 A1     Aug. 2, 2018

(30) Foreign Application Priority Data

Jul. 22, 2015  (GB) ..................................... 1512940

(51) Int. Cl.
*F16B 7/18*      (2006.01)
*E03F 9/00*     (2006.01)
(Continued)

(52) U.S. Cl.
CPC .............. *F16B 7/182* (2013.01); *E03C 1/302* (2013.01); *E03F 9/005* (2013.01); *F16B 37/064* (2013.01); *F16D 1/0894* (2013.01)

(58) Field of Classification Search
CPC .... F16B 7/18; F16B 7/182; E03C 1/30; E03C 1/302; E03F 9/002; E03F 9/005; F16D 1/08; F16D 1/0876; F16D 1/0894
See application file for complete search history.

(56) References Cited

U.S. PATENT DOCUMENTS

| 6,564,823 B1 * | 5/2003 | Mankins | ................. | E03C 1/302 |
| | | | | 137/15.14 |
| 2012/0110761 A1 | 5/2012 | Ripperger | | |

FOREIGN PATENT DOCUMENTS

| CH | 658105 A5 * | 10/1986 | .............. F16B 7/182 |
| EP | 1 522 743 A1 | 4/2005 | |

(Continued)

OTHER PUBLICATIONS

International Application No. PCT/IB2016/001031 International Search Report and Written Opinion, dated Oct. 28, 2016.

*Primary Examiner* — Jonathan P Masinick
(74) *Attorney, Agent, or Firm* — Woodard, Emhardt, Henry, Reeves & Wagner, LLP

(57) ABSTRACT

A drain rod system for connecting at least two rods together and/or to a peripheral device, said rods and/or devices connected or coupled together by one or more connection means which including a first male portion at least part of which includes a non-circular member and a second female portion at least part of which is configured to receive at least part of the non-circular member extending from an adjacent male portion. The connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand.

10 Claims, 5 Drawing Sheets

(51) Int. Cl.
 *E03C 1/302* (2006.01)
 *F16D 1/08* (2006.01)
 *F16B 37/06* (2006.01)

(56) References Cited

FOREIGN PATENT DOCUMENTS

| FR | 944105 A | * | 3/1949 | ............. E03C 1/302 |
| GB | 751258 A | * | 6/1956 | ............. E03C 1/302 |
| GB | 2024357 A | * | 1/1980 | ............. F16B 7/182 |
| GB | 2031090 A | * | 4/1980 | ............... F23J 3/026 |
| GB | 2 172 955 A | | 10/1986 | |
| GB | 2281597 A | * | 3/1995 | ............. E03C 1/306 |
| WO | WO2013/150275 | * | 10/2013 | |

* cited by examiner

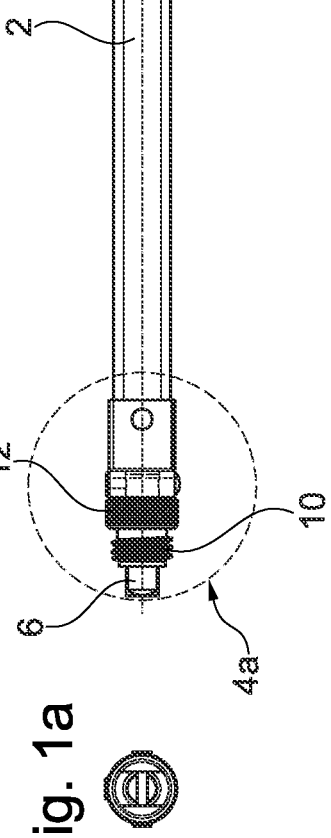
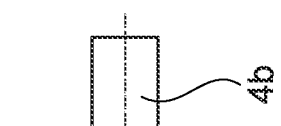
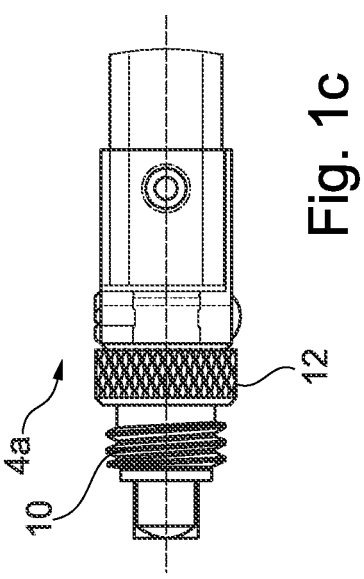

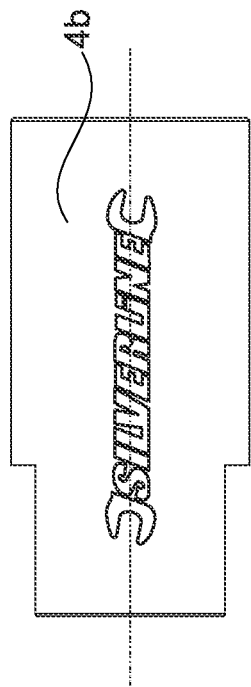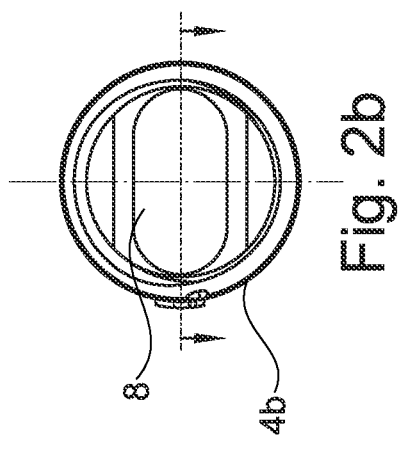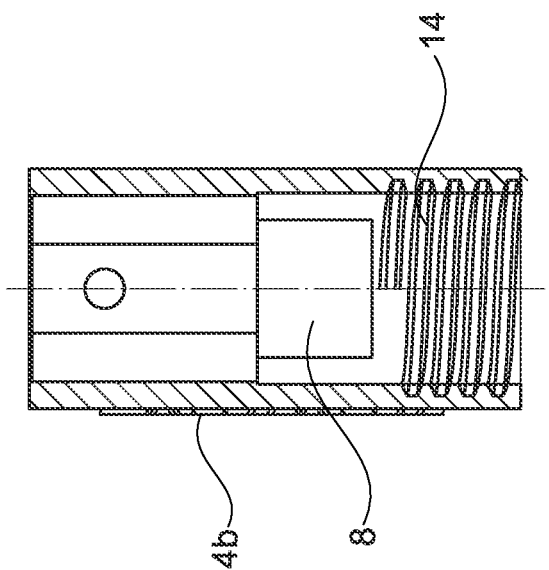

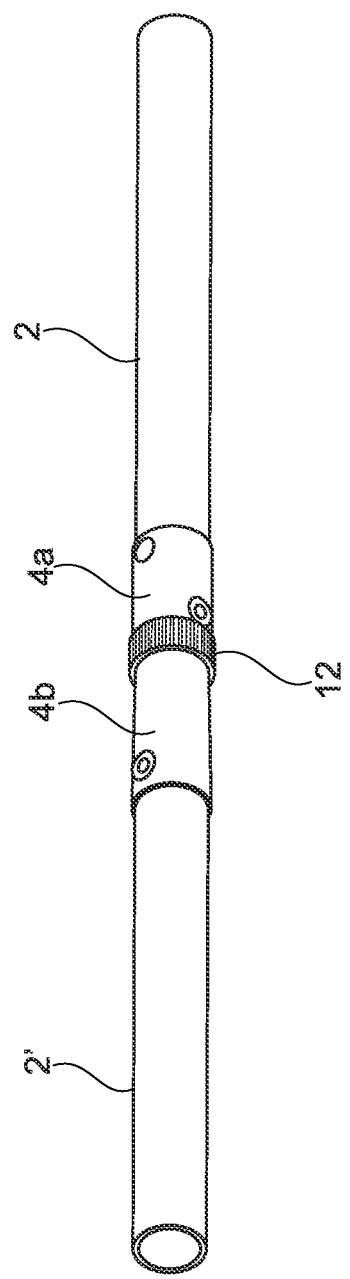

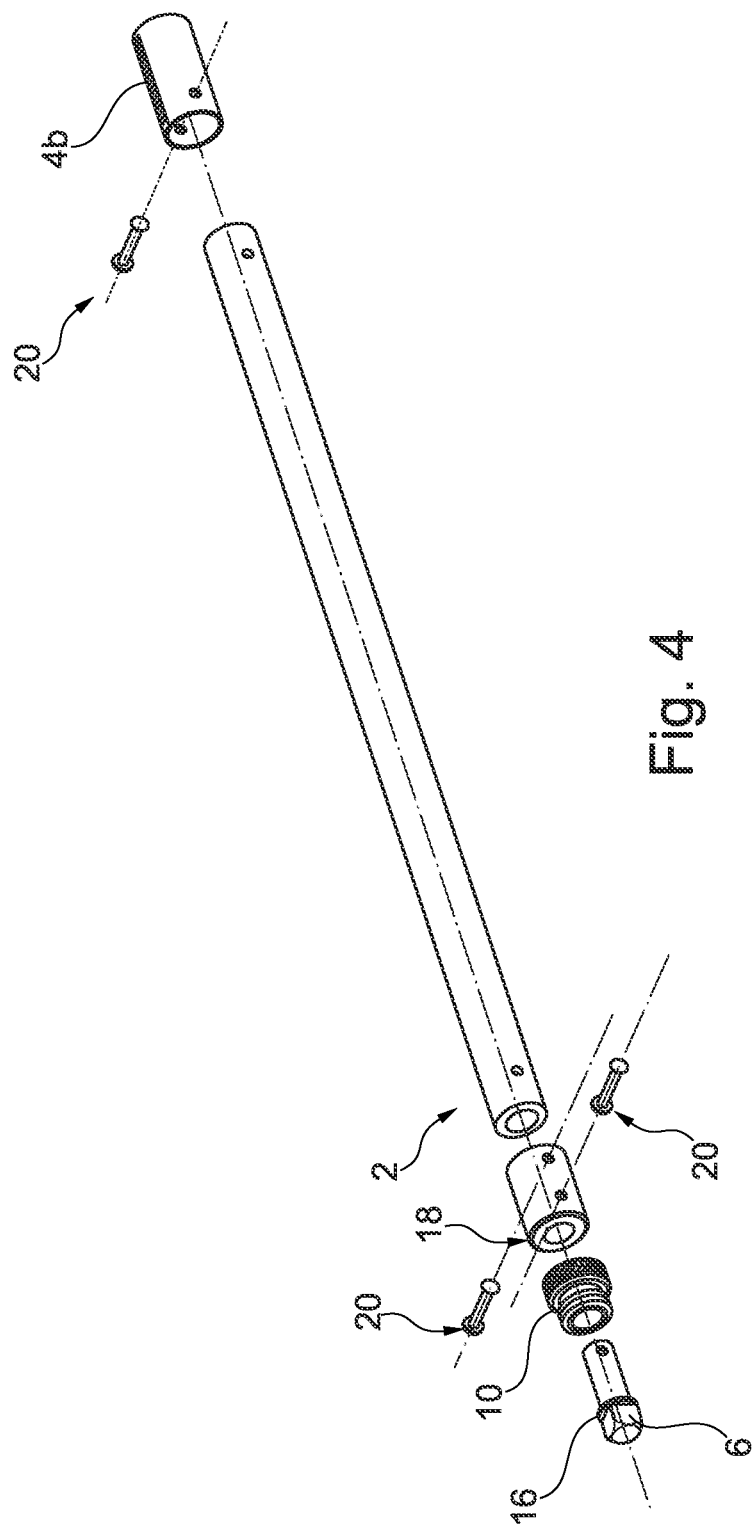

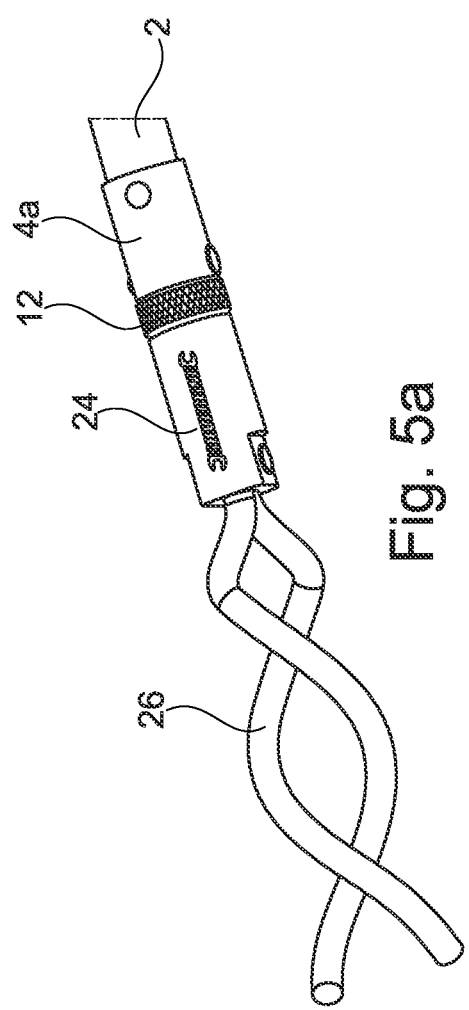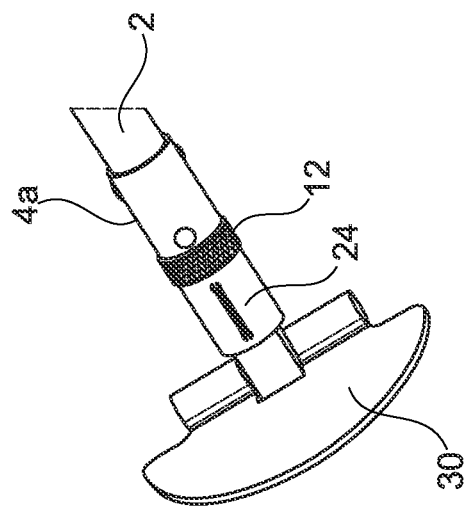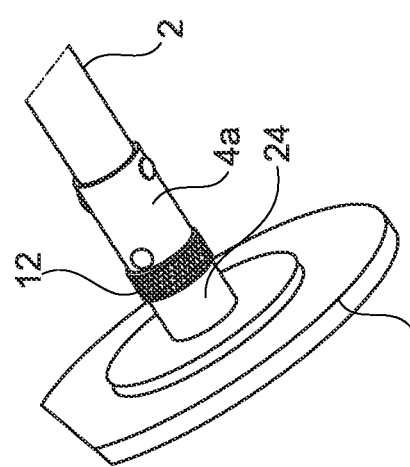

DRAIN ROD SYSTEM AND CONNECTORS THEREFOR

FIELD OF THE INVENTION

The present invention relates to an improved drain rod system and fittings therefore.

BACKGROUND OF THE INVENTION

Although the following description refers to drain rods and fittings or connectors for the same, the person skilled in the art will appreciate that the present invention could be used to connect linear articles and bars and is not limited to drain rods per se.

The cleaning or unblocking of pipes and drains with a series of interlocking rods is known. Conventionally, the rods are connected by a screw thread arrangement between each rod whereby a threaded protrusion extends from a first end of a rod and is received in a socket or orifice in a second end of an adjacent rod. A problem with such an arrangement is that during the cleaning or unblocking operation the rods can become loose and eventually disconnected. To avoid this situation many users tighten the fittings using tools such as spanners and/or the like. An additional problem with this is that the fittings can frequently overtightened resulting in damage to the drain rod fittings.

OBJECT OF THE INVENTION

It is therefore an aim of the present invention to provide an improved drain rod system that addresses the abovementioned problems.

SUMMARY OF THE INVENTION

If is a further aim of the present invention to provide a drain rod connection means that addresses the abovementioned problems.

It is a yet further aim of the present invention to provide a method of manufacturing a drain rod system and/or connection means for the same that addresses the abovementioned problems.

In a first aspect of the invention there is provided a drain rod system, said system including at least two rods, said rods connected and/or coupled together by one or more connection means, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand.

Thus a drain rod system is provided wherein the user can easily manipulate the rods and securely attach the same together by engaging the male and female portions and the first and second threaded members without requiring tools.

Typically the connection means comprises two parts, the first part located or mounted on a first end of a rod and a second part located or mounted on the second opposite end of a rod. Further typically each part includes at least one male or female portion and at least one threaded member.

Typically the rods are attached or engaged together by screwing at least part of the first and second threaded members together. Further typically rods are detached or disengaged by unscrewing at least part of the first threaded member from the second.

Preferably the grip portion includes a gnarled, patterned or roughened surface to improve grip. Further preferably the grip portion is substantially cylindrical.

In one embodiment the threaded members are substantially annular, cylindrical and/or circular in shape or configuration. Typically the first or second threaded member forms a collar around at least part of the first male and/or second female portion.

In a preferred embodiment the first part of the connection means includes a first threaded member forming a collar around at least part of the first male portion. Typically the second part of the connection means includes a second female portion and a second threaded member.

In one embodiment at least the ends or the rods are substantially hollow and or include an interior cavity. Typically the rods are hollow or substantially tubular in form.

In one embodiment the first male portion includes a lip or flange. Typically the lip or flange prevents the first threaded portion and/or the grip portion from being removed from the rod. Further typically at least the first part of the connection means is mounted on or abuts a mounting ferrule means.

In one embodiment the mounting ferrule provides a surface on which the threaded portion can turn.

In one embodiment the mounting ferrule includes a relatively low friction surface or washer. Typically the surface or washer is substantially annular or circular and includes a polymer such as PTFE and/or the like.

In one embodiment at least one of the edges of the non-circular member is removed or rounded. Typically at least the edges located on or adjacent to a latitudinal plane of the rods are chamfered or angled to aid insertion of at least part of the first portion into the second portion.

In one embodiment two opposing surfaces of the second female portion are configured to closely correspond with the dimensions of the non-circular member thereby preventing rotation of the same when engaged with or inserted into the female portion.

In one embodiment the first male portion includes a non-circular part and cylindrical or substantially circular part. Typically the cylindrical part extends through the threaded portion. Further typically the threaded portion is mounted on and/or rotates around the cylindrical portion.

In one embodiment the connection means are attached to the rods using one or more pins, bars, rivets and/or the like.

In one embodiment of the invention the system includes one or more peripheral devices. Typically said peripheral devices include any one or any combination of worm screws, plungers, scrapers and/or the like.

In one embodiment the peripheral devices includes one part of the connection means and at least one end of the rod includes a further part. Typically the rod includes at least the first male portion of the connecting means.

In one embodiment the scraper includes at least one semi-circular surface or plate pivotally mounted to the body of the device.

In a second aspect of the invention there is provided a connection means for connecting the ends of adjacent rods together in series, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand.

In a third aspect of the invention there is provided a method of manufacturing a connection means for rods, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand wherein the method of manufacture includes attaching at least part of the connection means to the distal end of a rod.

In a fourth aspect of the invention there is provided a system for connecting a drain rod to a peripheral device by one or more connection means, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand.

The male portion forms part of the drain rod or peripheral member and the female portion correspondingly forms part of the other peripheral member or drain rod.

Specific embodiments of the invention are now described with reference to the following figures wherein;

BRIEF DESCRIPTION OF THE DRAWINGS

FIG. 1a is a front elevational view of a drain rod in accordance with one embodiment of the invention;

FIG. 1b is a side elevational view of the FIG. 1a drain rod;

FIG. 1c is an exploded view of the FIG. 1a drain rod taken from circle 4a in FIG. 1a;

FIG. 2a is a cross section view of part of a drain rod connection member in accordance with one embodiment of the invention;

FIG. 2b is a front elevational view of the FIG. 2a drain rod connection member;

FIG. 2c is a side elevational view of the FIG. 2a drain rod connection member;

FIG. 3 shows a side view of drain rods connected together in series in accordance with one embodiment of the invention;

FIG. 4 shows an exploded view of a drain rod in accordance with one embodiment of the invention; and FIGS. 5a-5c show perspective views of accessories that can be connected to drain rods in accordance with one embodiment of the invention.

DETAILED DESCRIPTION OF THE DRAWINGS

The present invention provides a drain rod system that includes a coupling or locking mechanism so that a series of rods can be connected end to end in a secure manner without the need for tools such as spanners or the like.

In addition the invention provides a drain rod system for connecting at least two rods together and/or to peripheral devices, said rods and/or devices connected or coupled together by one or more connection means which including a first male portion at least part of which includes a non-circular member and a second female portion at least part of which is configured to receive at least part of the non-circular member extending from an adjacent male portion. The connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to engage or disengage the male and female portions and/or the first and second threaded members by hand.

Turning first to FIGS. 1a-1c where a side view of a drain rod 2 incorporating a two part locking system 4a, 4b is shown. The first part 4a of the system includes a non-circular member or pin 6 which, in use, is received in a non-circular socket 8 formed in the second part 4b of the system. As the at least some of the surface of the socket 8 conform to those of the pin 6, their non-circular configuration prevents engaged rods from pivoting or rotating relative to the other. Mounted on the pin 6 is a threaded member or male screw portion 10. The male screw portion is cylindrical or annular in cross section and includes a roughened or knurled surface 12 to improve the user's grip of the same.

A corresponding or complimentary threaded member or female screw portion 14 is formed in the second part 4b of the system, as shown in FIGS. 2a-2c. In use, opposite ends of the rods incorporating the system are offered up to one another substantially on the same axis, the pin 6 is engaged with the socket 8 and the threaded members 10, 14 screwed together to secure the rods in series. FIG. 3 shows a side view of two rods 2,2' joined together in such a manner.

FIG. 4 shows an exploded view of one embodiment of the invention where the configuration of the first part 4a can be seen. The distal end of the pin 6 is cuboid with chamfered or angled edges. A circular flange 16 or washer is formed behind the non-circular or cuboid portion and the cylindrical body of the pin 6 extends through the annular screw portion 10 and into a cylindrical collar 18 which is mounted on the first end of the rod 2. In this arrangement the screw portion 10 is captive between the substantially planar surface of the collar 18 and the flange 16 of the pin 6. The pin 6 and collar 18, as well as the second part 4b are secured to the rod 2 using a number or rivets 20 that pass through apertures formed in the same.

FIGS. 5a-5c show perspective views of ancillary or peripheral accessories 22a-c that can be connected to the rods using the present connecting system. The bodies 24 of the accessories typically include the receiving or female formations analogous the second part 4b of the system. FIG. 5a shows a worm screw 22a accessory whereby two substantially helical members 26 extend from the body portion 24. FIG. 5b shows a plunger whereby a circular rubber disc extends from the body. FIG. 5c shows an example whereby a semi-circular plate 30 is hingedly connected to the body in such a manner that the plate can lie substantially parallel or at an acute angle with the longitudinal axis of the rod when being inserted into a drain but is prevented from rotating more than perpendicularly or to an obtuse angle when the rod is being removed.

As such, presented herein is a locking assembly suitable for connecting together drain rods and their accessory devices wherein the assembly includes male and female non-circular portions and male and female threaded portions, said portions engaged or locked together using a grip portion.

The invention claimed is:

1. A drain rod system, said system including at least two hollow or tubular rods, said rods connected and/or coupled together by one or more connection means, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion of said first threaded member, wherein at least one or both of said threaded members includes a cylindrical grip portion to enable the user to screw together the male and female portions and/or the first and second threaded members by hand, said grip portion including a gnarled, patterned or roughened surface which improves grip, said first male portion including a lip or flange to prevent the first threaded member and/or the grip portion from being removed from the rod and wherein a cylindrical collar is attached to the rod using one or more pins, bars or rivets and the connection means first male portions or second female portions are also attached to the rods using said one or more pins, bars or rivets, said first threaded member being captive between a substantially planar surface of the collar and the lip or flange.

2. A system according to claim 1 wherein the threaded members are substantially annular, cylindrical and/or circular in shape or configuration.

3. A system according to claim 1 wherein at least the first part of the connection means is mounted on or abuts a mounting ferrule means.

4. A system according to claim 3 wherein the mounting ferrule provides a surface on which the threaded portion can turn.

5. A system according to claim 4 wherein the mounting ferrule includes a relatively low friction surface or washer.

6. A system according to claim 1 wherein two opposing surfaces of the second female portion are configured to closely correspond with the dimensions of the non-circular member thereby preventing rotation of the same when engaged with or inserted into the female portion.

7. A system according to claim 1 wherein the connection means are attached to the rods using one or more pins, bars, rivets and/or the like.

8. A system according to claim 1 wherein the system includes one or more peripheral devices including any one or any combination of worm screws, plungers, scrapers and/or the like.

9. A system according to claim 8 wherein the peripheral devices includes one part of the connection means and at least one end of the rod includes a further part.

10. A connection means for connecting the ends of adjacent rods together in series, said connection means including a first male portion at least part of which includes a non-circular member and a second female portion at least part of which is configured to receive at least part of the non-circular member extending from an adjacent male portion, the connection means further including first and second threaded engagement members, said first threaded member including a thread or threaded portion and at least part of the second threaded member adapted to receive at least part of the thread or threaded portion, wherein at least one or both of said threaded members includes a grip portion to enable the user to screw to engage or disengage the male and female portions and/or the first and second threaded members by hand, said grip portion including a gnarled, patterned or roughened surface which improves grip and the first or second threaded member forms a collar around at least part of the first male and/or second female portion, said first male portion including a lip or flange to prevent the first threaded member and/or the grip portion from being removed from the rod and said first threaded member being captive between a substantially planar surface of the collar and the lip or flange.

* * * * *